United States Patent Office 3,220,931
Patented Nov. 30, 1965

3,220,931
METHOD FOR THE MANUFACTURE
OF PEPSIN
William O. Munns, Weston, Ontario, and Eugene Dut-
kewych, Toronto, Ontario, Canada, assignors to Canada
Packers Limited, Toronto, Ontario, Canada
No Drawing. Filed Aug. 30, 1962, Ser. No. 220,577
18 Claims. (Cl. 195—66)

This invention relates to an improved method of isolating pepsin from animal stomach linings, such as hog stomach linings. More particularly, this invention relates to a novel method of producing pepsin from animal stomach linings in which the stomach linings are comminuted, activated with acid, dried and treated to extract pepsin without substantial dissolution of the mucin and mucosa.

In the conventional methods for the recovery of pepsin from hog stomach linings, the ground linings have been combined with various aqueous solutions to extract the pepsin or pepsinogen. After removal of the spent linings, the pepsin is then recovered from the aqueous mixture by such methods as salting out, precipitation as a heavy metal complex and decreasing the dielectric constant by adding an organic solvent such as acetone or ethanol. However, these prior art processes are laborious and costly and the yields obtained are low. The difficulties encountered by the prior art are chiefly due to three causes. First, the dissolution of mucin in the aqueous mixture and the presence of fat results in a slimy mass from which it is difficult to remove the spent linings. Second, since the mucin is solubilized it later has to be removed before the pepsin can be recovered. Third, if acetone or ethyl alcohol are used to precipitate the pepsin, an excessive quantity of these solvents is necessary to obtain the required concentrations due to the large amounts of water inherently present in the linings and the additional water introduced during the extraction.

It is, therefore, an object of the present invention to provide a novel method of producing pepsin from animal stomach linings which avoids the aforementioned difficulties.

Another object of the invention is to provide a method for the recovery of pepsin from acid-digested stomach linings wherein the separation of the pepsin from the residual linings and mucin is greatly facilitated.

Another object of the invention is to provide a novel method for the removal of moisture and fat from activated stomach linings in a process for producing pepsin.

A further object of the invention is to provide a method for recovery of pepsin from dried activated stomach linings without substantial dissolution of the mucin, thereby avoiding filtration problems.

A still further object of the invention is to provide a simple and practical method for producing pepsin in good yield from stomach linings.

Additional objects and advantages will be apparent from the following description and claims.

The method of the invention, in its overall aspect, comprises grinding the stomach linings and treating them with acid to activate the pepsinogen to pepsin, following which the entire mixture is dried under conditions which will not inactivate the pepsin. The drying may be carried out either in a vacuum oven or similar apparatus, or by azeotropic distillation. The latter is preferred because it permits simultaneous removal of water and defatting of the linings thereby contributing to the ease with which pepsin may be subsequently extracted. The pepsin is then separated from the desiccated-activated stomach linings by extracting them with an alcohol solution of such concentration that the pepsin will dissolve but not the mucin. Since the mucin is not brought into solution, the separation of the residual linings is greatly facilitated. The previous removal of water from the activated linings reduces the amount of alcohol necessary to provide the desired concentration. The pepsin extract is removed from the undissolved material and the alcohol concentration of the extract solution is increased to a level at which pepsin precipitates. The substantial absence of mucin in the extract makes possible a relatively clean-cut precipitation of the pepsin. Yields of pepsin of the order of 5% based on a proteolytic value of 1:10,000 strength are obtainable with this method, and all operations are readily carried out in available plant equipment.

In the initial stage of the process, the stomach linings are ground and treated with HCl. The purpose of this treatment is to activate pepsinogen, the inactive form of pepsin which constitutes 90% of the potential peptic activity in hog stomach linings. The conversion of the enzyme to its active form prior to the drying step has been found essential. The concentration of HCl is not critical and excellent results are obtained with 12 N HCl which is the usual article of commerce. The amount of HCl may be varied over a wide range, from about 4 to 20 mls. of 12 N HCl per pound of linings providing good results. A good percentage of activation is obtained when sufficient acid is added to adjust the pH of the lining to between about 0.5 and 2.5 while excellent results are obtained at a pH of about 2.0. The pH range, however, is not sharply critical and it is not intended that the process should be restricted to this range. If desired, the HCl may be added while the lining is being ground, and the lining may be digested in the added acid at an elevated temperature below that at which the enzyme would be destroyed.

After the stomach lining is activated, it is dried either in a vacuum apparatus or by azeotropic distillation. In Table I below are shown some typical results obtained with drying in a vacuum oven:

TABLE I.—THE ACTIVATION AND VACUUM OVEN DESICCATION OF HOG STOMACH LININGS

| Expt. No. | Amount and concentration hydrochloric acid used (mls./ lb. of linings) | | | pH of linings after acid addition | Drying conditions | | Total pepsin plus pepsinogen content of desiccated linings (units/gm.) | Percent of enzyme present in activated (pepsin) form in desiccated linings |
|---|---|---|---|---|---|---|---|---|
| | 1N | 6N | 12N | | Temp. (°C.) | Time (hrs.) | | |
| 1 | | | None | | 66 | 60 | 3,390 | 1 |
| 2 | | | 11 | 2.0 | 66 | 60 | 3,170 | 87 |
| 3 | | 41 | | 0.5 | 66 | 60 | 740 | 83 |
| 4 | 159 | | | 1.4 | 66 | 60 | 1,230 | 88 |
| 5 | | | None | | 5.9 | 66 | 15 | 3,480 | 19 |
| 6 | | | 8 | 2.1 | 66 | 15 | 3,480 | 96 |
| 7 | | 16 | | 1.9 | 66 | 15 | 3,560 | 94 |
| 8 | | 63 | | 2.2 | 66 | 15 | 3,370 | 78 |
| 9 | | | None | | 6.4 | 77 | 15 | 3,600 | 19 |
| 10 | | | 10 | 1.8 | 77 | 15 | 3,140 | 97 |
| 11 | | 20 | | 2.1 | 77 | 15 | 2,920 | 93 |
| 12 | 83 | | | 2.2 | 77 | 15 | 3,030 | 96 |

Because of the simultaneous defatting and the shorter time required, drying by azeotropic distillation is preferred. In carrying out this procedure, the stomach lining is combined with a suitable organic solvent which forms an azeotrope with the water in the stomach lining.

The simultaneous drying and defatting of enzymatic animal tissue by azeotropic distillation has previously been proposed in patents granted to Ezra Levin. The organic solvents suggested for this purpose were those fat solvents boiling below 120° C., and preferably well below 100° C., the preferred class of solvents being the halogenated derivatives of low boiling aliphatic hydrocarbons. Ethylene dichloride, in particular, has received special attention.

The azeotropic drying and defatting operation with the previously proposed solvents may be employed in the combination of the present invention. However, a special feature of the present invention resides in the discovery that the azeotropic drying and defatting steps may be carried out to greater advantage with a higher boiling and less toxic fat solvent. The preferred fat solvent is xylene, which has a boiling point of 139° C. at 760 mm. Hg, and forms an azeotrope containing 35.8% by weight of water which boils at 92° C. at 760 mm. Hg. Ethylene dichloride, on the other hand, boils at 84° C. and forms an azeotrope containing only 19.5% by weight of water.

Unexpectedly, it has been found possible to use the high boiling xylene without adversely affecting the pepsin stability. The following advantages of xylene with respect to the chlorinated hydrocarbons are realized: (1) The fumes of xylene are less toxic; (2) The azeotrope with xylene contains a much higher percentage of water and, as a result, a much shorter drying time is required; (3) The cost of xylene is relatively low. Thus the process can be performed with less hazard and much more rapidly and economically with xylene than the previously proposed solvents.

The distillation procedure is carried out in known manner. Thus, the activated linings may be placed in a still provided with a jacket through which hot water is circulated for heating purposes. The distillation is conducted under a vacuum, e.g., at a pressure in the range of about 10–250 mm. Hg, so that the maximum temperature is below the boiling point of the solvent at atmospheric pressure. For example, distillation may be commenced at a temperature below about 60° C., and maintained at this temperature until there is a sharp rise of about 20° C. in the boiling point of the solvent. The distillation may then be stopped shortly after this rise in temperature. Preferably, the entire operation is within the temperature range of 35 to 80° C.

In Table II below are shown the results of a number of experiments in which hog stomach linings were activated with concentrated hydrochloric acid and then dried and defatted by azeotropic distillation with ethylene dichloride.

TABLE II.—THE AZEOTROPIC DEFATTING AND DESICCATING OF ACTIVATED HOG STOMACH LININGS WITH ETHYLENE DICHLORIDE

| Expt. No. | Drying conditions | | Yield of dried activated linings | |
|---|---|---|---|---|
| | Bath temp., (° C.) | Drying time (hrs.) | Peptic activity (units/gm.) | Yield as 1:3000 pepsin (percent wt. of fresh linings) |
| 1 | 40–60 | 10½ | 3,860 | 26.2 |
| 2 | 40–55 | 11 | 4,050 | 24.7 |
| 3 | 40–60 | 11 | 4,080 | 26.6 |
| 4 | | 12 | 4,670 | 31.5 |
| Average | | | 4,165 | 27.3 |

The results of a number of experiments utilizing xylene as the solvent and with the same general conditions as employed for ethylene dichloride are contained in Table III below:

TABLE III.—THE AZEOTROPIC DEFATTING AND DESICCATING OF ACTIVATED HOG STOMACH LININGS USING XYLENE

| Expt. No. | Drying conditions | | | Yield of dried activated linings | |
|---|---|---|---|---|---|
| | Bath temp. (° C.) | Solvent temp (° C.) | Drying time (hrs.) | Peptic activity (units/gm.) | Yield as 1:3000 pepsin (percent wt. of fresh linings) |
| 1 | 74–82 | 51–74 | 6 | 3,432 | 29.3 |
| 2 | 75–84 | 53–76 | 4 | 3,350 | 26.9 |
| 3 | 71–86 | 53–76 | 4¾ | 3,760 | 25.0 |
| 4 | 83–86 | 51–76 | 4½ | 3,740 | 25.6 |
| 5 | 75–86 | 49–74 | 4 | 4,310 | 25.4 |
| 6 | 83–86 | 51–74 | 3 | 4,670 | 26.6 |
| 7 | 83–87 | 54–69 | 3¼ | 4,250 | 25.3 |
| Average | | | 4¼ | 3,930 | 26.3 |

In Tables II and III above, the lower solvent temperature is that at which distillation was begun and the higher solvent temperature is that at which distillation was terminated. A pressure of approximately 70 mm. Hg was used in both series of tests. It will be apparent that the peptic activity and yield of the material produced by xylene distillation is approximately the same as in the ethylene dichloride process. However, the drying time has been cut by approximately two-thirds by use of xylene.

A further series of experiments were conducted with xylene distillation but with linings activated by various quantities of acid. The results are given in Table IV below:

TABLE IV.—ACTIVATION AND AZEOTROPIC XYLENE DESICCATION OF HOG STOMACH LININGS

| Expt. No. | Amount of hydrochloric acid used for activation (mls. 12 N HCl/lb. of linings) | Drying conditions | | | Yield of dried activated linings | |
|---|---|---|---|---|---|---|
| | | Bath temp. (° C.) | Solvent temp. (° C.) | Drying time (hrs.) | Peptic activity (units/gm.) | Yield as 1:3000 pepsin (percent wt. of fresh linings) |
| 1 | 2 | 73–79 | 39–57 | 3½ | 2,840 | 13.1 |
| 2 | 4 | 74–79 | 37–59 | 3½ | 4,230 | 22.0 |
| 3 | 6 | 77–81 | 38–57 | 3½ | 4,511 | 30.5 |
| 4 | 8 | 74–82 | 36–58 | 3½ | 4,240 | 24.6 |
| 5 | 10 | 76–78 | 40–61 | 4 | 4,744 | 30.4 |
| 6 | 12 | 78–79 | 43–65 | 2½ | 5,381 | 26.9 |
| 7 | 12 | 70–77 | 40–64 | 3 | 4,888 | 27.3 |
| 8 | 14 | 70–77 | 40–63 | 4 | 4,950 | 31.3 |
| 9 | 16 | 70–77 | 40–62 | 4 | 3,726 | 26.6 |
| 10 | 18 | 70–77 | 40–62 | 3½ | 3,996 | 20.4 |
| 11 | 20 | 70–77 | 40–62 | 4 | 3,037 | 18.2 |
| 12 | 22 | 70–77 | 40–62 | 4 | 2,296 | 17.8 |

It will be seen that approximately 10 to 16 mls. of concentrated HCl per pound of hog stomach linings provide the maximum unit activity.

After the activated stomach linings are dried, the pepsin is recovered by alcoholic extraction. This is accomplished by mixing the dried linings in an aqueous ethanol solution having an alcoholic strength above 50% but below 70% by volume. In this range of alcoholic concentration pepsin, but very little mucin, will dissolve. The extract containing the pepsin is then removed from the insoluble residue and the pepsin is precipitated from the extract by increasing the alcoholic concentration to at least about 70%. The pepsin may then be recovered with ease by filtration procedure.

The extraction of the pepsin from the dried linings and mucin is best accomplished when the strength of the alcoholic extract solution is between about 57–60%. Additionally, it has been found that the pH of the alcoholic solution has some effect on this separation. In general, the pH should be below about 4.5. Satisfactory results have been obtained with pH values from 1.0 to 4.5. However, we prefer to use a pH in the range of about 3–4 with 3.5 being considered as optimum. Recoveries of peptic activity from the dried linings in the alcoholic extract of above 80% are obtainable.

In precipitating the pepsin from the alcohol solution by increasing the strength of the solution to at least 70%, it is best to adjust the pH of the precipitating solution to about 5.0 which is the pH of minimum solubility of pepsin in alcohol. The pH may be adjusted by the addition of any suitable base, including, for example, sodium hydroxide, alkali metal bicarbonate, and ion exchange resins. Particularly good results are obtained when a saturated solution of either sodium or potassium bicarbonate is used. Since the addition of alcohol to the solution of pepsin in alcohol raises the pH of the solution, it is preferred that the pH of the solution be initially adjusted to a pH of about 4.5. In this manner a pH of about 5.0 is obtained when the alcoholic concentration reaches about 70%. In this regard, it is to be noted that a pH of much above pH 5.0 is harmful to pepsin. A pH of 5.5 produces a pepsin precipitate which may be gummy and difficult to wash. Optimum results are obtained when the pepsin is allowed to precipitate from an alcoholic solution with a strength of about 72% and a pH of about 5.0.

The precipitated pepsin may be readily separated from the alcohol by filtration. Upon drying this pepsin there is obtained a white amorphous product which is not completely soluble in water and which we have designated as "powder" pepsin. A product known in the art as "spongy-granular" pepsin, which is completely soluble in water, may be obtained by further treating the "powder" pepsin. This treatment includes suspending the powder pepsin in water with agitation and then removing the solid material which remains undissolved. The clear solution thus obtained is dried, yielding spongy granular pepsin. Preferably, the pH of the suspension is adjusted to about 3.0 prior to the removal of the solid material. It has been found that the yield of spongy granular pepsin can be improved by the addition of sodium acetate to the water to increase dissolution of pepsin. Additionally, it has been found that the enzyme may be protected during drying by the presence of a stable protein substance, such as gelatin, which may be added to the water. Further, since the spongy granular product is usually standardized at either 3,000 or 10,000 units per gram, sucrose may be added to the water to act as a diluent of the final product.

The following examples further illustrate the present process but are not intended to limit the scope of the invention in any way.

*Example I*

75 pounds of frozen hog stomach linings were chopped into small pieces. The chopped linings were placed in a jacketed kettle and 975 mls. of concentrated hydrochloric acid (12 N) were added while agitating the linings. Water at 49° C. was then circulated through the jacket of the kettle to digest the linings. This digestion was continued with agitation for 6 hours. Cold water was then applied to the jacket of the kettle and the contents cooled to 25° C.

6¼ pounds of the digested linings were homogenized with 6 gallons of xylene and were added to an agitated 50 gallon stainless steel still to which 10 gallons of xylene had already been added. The still was operated under a pressure of about 70 mm. Hg and heated by circulating 75–80° C. water through the still jacket. Fifteen minutes after distillation was commenced, an additional 6¼ pound portion of digested linings was added to the still. Similar portions were added every 15 minutes until all the activated linings were in the still. The azeotrope from the still was allowed to separate and the recovered solvent was returned to the still to maintain a minimum volume of 30 gallons from the time of the last addition of the digested linings to the end of the drying. This was continued until all the linings were completely desiccated. A rise in temperature of the boiling solvent from approximately 40 to 60° C. occurred at the end of the drying. The distillation was continued for about 20 minutes after this rise in temperature. The activated linings were then recovered by filtration on a perforated bowl centrifuge fitted with a cloth bag. They were then washed with approximately 5 gallons of fresh xylene. The activated linings were removed from the centrifuge, suspended in 5 gallons of hexane and re-centrifuged. The final product was washed on the centrifuge with a further one-gallon portion of fresh hexane. The product was loaded into trays and placed in an air drier at 30 to 35° C. overnight.

Example II

Fifty pounds of dried linings from Example I were ground so as to pass through a screen having an aperture of 0.0282 inch (screen size 00). The dry ground linings were added gradually, with stirring, to 40 gallons of 60% ethanol which was maintained at 0–5° C. When the solids were completely dispersed, the pH was adjusted to 3.5 by adding a sufficient quantity of 6 N hydrochloric acid made up with equal volumes of concentrated HCl (12 N) and 60% alcohol. Agitaion was continued for an additional 3 hours. The suspension was then filtered and the solids were washed with 60% ethanol to be used for further extractions of additional batches of dried linings.

The clarified filtrate was adjusted to a pH of 4.5 by slowly adding 10 liters of a saturated solution of potassium bicarbonate. Good stirring was maintained to insure rapid dispersion of the bicarbonate. Twenty-five gallons of 95% ethanol were then added to raise the alcoholic strength of the solution to 72% by volume. Agitation was stopped and the pepsin was allowed to settle. The pepsin precipitate was filtrated out and washed with 95% ethanol. The semi-dry cake was air dried at 27° C., yielding about 1.8% of "powder" pepsin (based on the weight of the fresh linings) having a peptic activity of about 26,250 units per gram. The yield of 1:10,000 pepsin, based on the weight of the fresh linings, therefore, was 4.8%.

Example III

Three hundred pounds of frozen hog stomach linings were chopped into fine pieces and placed in an 80-gallon stainless steel kettle and 3900 mls. of concentrated hydrochloric acid (12 N) were added. Water at 49° C. was circulated through the jacket of the kettle and the mass in the kettle was agitated until the digestion of the linings was complete (between 3 to 6 hours). Cold water was then applied to the jacket of the kettle and the contents were cooled to about 25° C. The digested mass was then loaded into trays of a vacuum shelf drier and dried in vacuo at 65° C. for 16 to 24 hours. A recovery of dried material of about 19% by weight, based on the weight of the fresh linings, was made. This material had a peptic activity of about 3810 units per gram. The yield of pepsin on the basis of 1:3,000 peptic activity, based on the weight of the fresh linings, was about 24%. A portion of this dried material was worked up for recovery of powder pepsin in the same manner as given in Example I and produced powder pepsin in 1.7% by weight yield, based on the weight of the fresh linings, having peptic activity of 29,400 units per gram. The yield of 1:10,000 pepsin based on the weight of the fresh linings therefore was about 5.1%.

Example IV

A portion of the "powder" pepsin, as prepared in Examples I and II, was converted to spongy granular pepsin by addition to an aqueous solution containing hydrolyzed gelatin, sucrose and about 4% of sodium acetate based on the weight of the "powder" pepsin. The hydrolyzed gelatin and sucrose in 1 to 24 weight ratio were present in the solution in the amount calculated to dilute the peptic activity of the added pepsin to 1:10,000 strength. After dissolution of the pepsin, the mixture was filtered and the filtrate was dried in vacuo at 66° C. for 16 hours, yielding "spongy granular" pepsin with a peptic activity of 10,000 units per gram. The loss of peptic activity during the conversion from the powder to spongy granular form was negligible.

It will be seen from the foregoing examples that both drying methods, when combined with the novel steps for recovery of the pepsin, provide yields of 1:10,000 pepsin of the order of 5% of the weight of fresh hog stomach linings processed. This yield is approximately double that which has heretofore been obtainable with conventional methods.

The procedure is characterized by its simplicity and freedom from filtration problems, and the economics are quite favorable compared to other processes.

We claim:

1. A process for obtaining pepsin from animal stomach linings comprising activating the peptic enzyme of said linings with acid; drying the activated linings; extracting the pepsin from said dried activated linings with an aqueous alcohol solution having an alcoholic concentration above about 50% but less than 70% by volume so as to dissolve the pepsin without substantially dissolving mucin which is present in said linings; removing the pepsin solution from the undissolved material; precipitating said pepsin from said solution by increasing the alcoholic concentration of said solution to at least 70% alcohol by volume and recovering said precipitated pepsin from said solution.

2. The process as defined in claim 1 wherein the activated linings are vacuum dried.

3. The process as defined in claim 1 wherein the activated linings are simultaneously dried and defatted by azeotropic distillation with a fat solvent.

4. A process as claimed in claim 1 wherein said alcoholic solution with which the dried linings are extracted has a pH below about 4.5.

5. A process as claimed in claim 1 wherein said alcoholic solution with which the dried linings are extracted has a pH of between about 3.0 and 4.0.

6. A process as claimed in claim 4 wherein said alcoholic solution from which pepsin is precipitated has a pH of about 5.0, said pH being adjusted by the addition of a base.

7. A process as claimed in claim 6 wherein said base is an aqueous solution of a member selected from the group consisting of sodium bicarbonate and potassium bicarbonate.

8. A process as claimed in claim 6 wherein the alcoholic concentration of the solution from which pepsin is precipitated is about 72% by volume.

9. A process as claimed in claim 1 including the additional step of suspending said recovered pepsin precipitate in water, adding sodium acetate to said water to aid in the dissolution of said pepsin, filtering said solution and drying said filtrate to thereby obtain a spongy granular form of pepsin.

10. A process for obtaining pepsin from animal stomach linings comprising treating said linings with acid to activate the peptic enzyme of said linings; simultaneously drying and defatting the activated linings by azeotropic distillation with xylene; extracting said dried, defatted linings with an alcohol solution having an alcoholic concentration of more than 50% but less than 70% by volume to thereby dissolve the pepsin in said linings without dissolving mucin which is present in said linings; removing the pepsin solution from the undissolved material; precipitating said pepsin from said solution by increasing the alcoholic concentration of said solution to at least 70% by volume and recovering said precipitated pepsin from said solution.

11. A process as claimed in claim 10 wherein said azeotropic distillation is conducted under a vacuum in a temperature range of between about 35° C. to 80° C.

12. A process for obtaining pepsin from animal stomach linings comprising treating said linings with hydrochloric acid to activate the peptic enzyme of said linings; simultaneously drying and defatting the activated linings by azeotropic distillation with xylene at a temperature in the range of 35° C. to 80° C.; extracting said dried, defatted linings with an alcoholic solution having an alcoholic concentration of more than 50% but less than 70% by volume and a pH of between 1.0 and 4.5 to thereby dissolve the pepsin in said linings without substantially dissolving mucin which is present in said linings;

removing the pepsin solution from the undissolved material; adding alcohol to said solution to raise the alcoholic concentration to at least 70% by volume thereby precipitating said pepsin and recovering said precipitated pepsin from said solution.

13. A process for recovering pepsin from activated dried animal stomach linings comprising extracting said stomach linings in an aqueous alcohol solution having an alcoholic concentration of more than 50% but less than 70% by volume thereby dissolving the pepsin but not the mucin, removing the pepsin solution from the undissolved material, precipitating the pepsin by increasing the alcoholic concentration to at least 70% by volume and recovering said pepsin from said solution.

14. A process as claimed in claim 13 wherein said alcoholic solution with which the dried linings are extracted has a pH below about 4.5.

15. A process as claimed in claim 14 wherein said alcoholic solution with which the dried linings are extracted has a pH of between about 3.0 and 4.0.

16. A process as claimed in claim 14 wherein said alcoholic solution from which pepsin is precipitated has a pH of about 5.0, said pH being adjusted by the addition of a base.

17. A process as claimed in claim 16 wherein said base is an aqueous solution of a member selected from the group consisting of sodium bicarbonate and potassium bicarbonate.

18. A process as claimed in claim 16 wherein the alcoholic concentration of the solution from which pepsin is precipitated is about 72% by volume.

References Cited by the Examiner
UNITED STATES PATENTS

| | | | |
|---|---|---|---|
| 1,068,354 | 7/1913 | Mayo | 8—139.1 |
| 1,934,677 | 11/1933 | Ash | 99—209 X |
| 2,176,705 | 10/1939 | Derby | 8—139.1 |
| 2,503,313 | 4/1950 | Levin | 195—67 |
| 2,567,378 | 9/1951 | Kennedy et al. | 195—66 |
| 2,701,228 | 2/1955 | McKerns | 195—66 |

A. LOUIS MONACELL, *Primary Examiner.*

ABRAHAM H. WINKELSTEIN, *Examiner.*